(12) United States Patent
Son

(10) Patent No.: US 9,906,479 B1
(45) Date of Patent: Feb. 27, 2018

(54) STORAGE MANAGEMENT FOR EPHEMERAL MESSAGES

(71) Applicant: SNAP INC., Venice, CA (US)

(72) Inventor: Aaron Son, Venice, CA (US)

(73) Assignee: SNAP INC., Venice, CA (US)

( * ) Notice: Subject to any disclaimer, the term of this patent is extended or adjusted under 35 U.S.C. 154(b) by 246 days.

(21) Appl. No.: 14/740,786

(22) Filed: Jun. 16, 2015

(51) Int. Cl.
*G06F 15/16* (2006.01)
*H04L 12/58* (2006.01)

(52) U.S. Cl.
CPC ............ *H04L 51/18* (2013.01); *H04L 51/046* (2013.01)

(58) Field of Classification Search
CPC ............. H04L 67/1097; H04L 67/1095; H04L 67/2842; H04L 12/01; H04L 12/6418; H04L 29/08144; H04L 29/0827; H04L 29/08549; H04W 24/02; H04W 4/02; H04W 64/006; H04W 8/23; G06Q 10/087; G06Q 10/10
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Roote et al. | |
| 8,995,433 B2 | 3/2015 | Rojas | |

(Continued)

FOREIGN PATENT DOCUMENTS

CA 2887596 A1 7/2015

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

*Primary Examiner* — Shean Tokuta
*Assistant Examiner* — Thao Duong
(74) *Attorney, Agent, or Firm* — Schwegman Lundberg & Woessner, P.A.

(57) ABSTRACT

A storage controller processes electronic messages by partitioning a storage device into logical disks and designating a logical disk as unavailable based on its storage capacity being fully used. A future time is assigned to each logical disk that is available for writing, and an estimated deletion time is determined for an electronic message. The electronic message is stored in a logical disk that is identified by comparing the assigned future times of the logical disks to the estimated deletion time of the electronic message. The electronic message is deleted based on the detection of a triggering event. If deleting messages result in an unavailable logical disk having more than a threshold amount of unused storage capacity, then each of the electronic messages stored in the unavailable logical disk is copied to a logical disk available for writing and the unavailable designation is removed from the logical disk.

19 Claims, 8 Drawing Sheets

(56) References Cited

U.S. PATENT DOCUMENTS

| | | | |
|---|---|---|---|
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 2006/0041619 A1* | 2/2006 | Gusler | G06F 3/0608 709/205 |
| 2006/0221988 A1* | 10/2006 | Geyer | G06Q 10/10 370/412 |
| 2011/0202598 A1 | 8/2011 | Evans et al. | |
| 2012/0066742 A1* | 3/2012 | Tsuruga | G06F 21/10 726/3 |
| 2012/0079096 A1* | 3/2012 | Cowan | G06F 11/3006 709/224 |
| 2012/0209924 A1 | 8/2012 | Evans et al. | |
| 2014/0032682 A1* | 1/2014 | Prado | H04L 51/34 709/206 |
| 2015/0227602 A1* | 8/2015 | Ramu | G06F 17/30575 707/634 |
| 2016/0164816 A1* | 6/2016 | Bhagwan | H04L 51/18 709/206 |

\* cited by examiner

STORAGE MANAGEMENT FOR EPHEMERAL MESSAGES

TECHNICAL FIELD

The subject matter disclosed herein generally relates to processing and storing electronic messages. More specifically, the present disclosure describes systems and methods for the temporary back-end storage and automatic deletion of certain "ephemeral" messages, e.g., messages that may only be viewed by recipients for a specified period of time and are deleted afterwards.

BACKGROUND

Electronic communications, such as e-mail or text messages, images, video, multimedia, etc., over networks, such as the Internet, can be a very convenient means of communication. However, security concerns can limit the appeal of such communications. For example, while encryption may provide a degree of privacy and security for a message while in transit, once the message is received by recipients, the sender of the message typically loses control over how the message is dealt with by the recipients. For example, a message sender may only wish the recipient to be in possession of the message for a specific period of time, but the recipient may choose to retain the message in his or her message store beyond that period. Ephemeral messages set to be automatically deleted after a specific trigger event or a specified period of time may be used to address this concern, and therefore efficient systems and methods for processing and storing the temporary data of such ephemeral messages are desirable.

BRIEF DESCRIPTION OF THE DRAWINGS

The present disclosure is illustrated by way of example, and not by way of limitation, in the figures of the accompanying drawings, in which.

DETAILED DESCRIPTION

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A messaging system may provide a message sender with additional control over electronic messages, such as text messages or photos, after they have been received by a recipient. The embodiments described herein provide systems and methods for processing and storing ephemeral messages intended for automatic deletion after receipt or upon consumption of the message by a recipient. These embodiments will be described in relation to mobile wireless communication devices, hereafter referred to as client devices, for sending and receiving electronic messages such as text messages, photos or videos, and associated servers for receiving and forwarding messages to and from the client devices. It will be appreciated by those skilled in the art, however, that this description is not intended to limit the scope of the described embodiments to the communication devices described below or to any specific electronic message formats. The methods and systems described herein may be applied to any appropriate communication or data processing device and to any appropriate electronic communication format.

Overview

Figure 1:
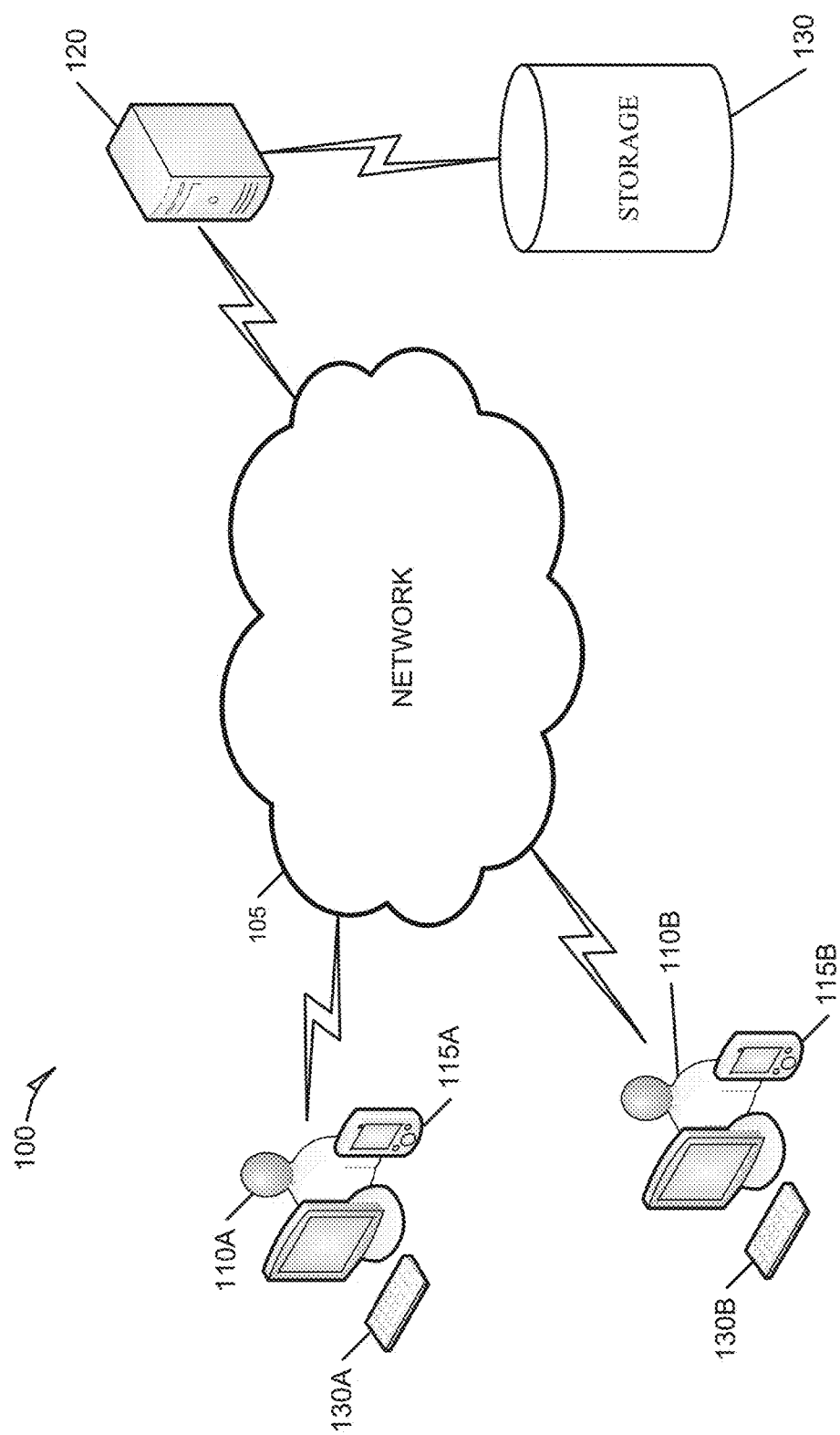
FIG. 1 is a use-case diagram showing a network system configured to process electronic messages over a network consistent with some embodiments.

FIG. 1 is a use-case diagram showing a network system 100 configured to transmit messages over a network 105 (e.g., the internet) consistent with some embodiments. In an embodiment, a remote server includes or acts as a storage controller 120 for storage 130 that may include non-durable (e.g., volatile) and durable (e.g., non-volatile) memories for storing ephemeral messages received from a client device. The messages may be stored in a partition of the storage 130 for a time period before being deleted or copied to another partition of the storage 130. The messages may be deleted based on detection of a triggering event, such as the message being read by a recipient of the message, responded to by a recipient of the message or copied to a storage device by a recipient of the message. For example, messages that are quickly read by the recipients (e.g., within the time period) may simply be deleted from the storage 130 without having been copied to another partition of the storage 130. The client device may be a mobile client device 115A or a more static client device 130A (e.g., a desktop computer) of a user (e.g., sender 110A) of the network 105. The storage controller 120 may partition the storage 130 into logical disks. A logical disk (or virtual disk) is a virtual device (e.g., a file treated as a device) that provides an area of usable storage capacity on one or more physical components in a computer system. The storage controller 120 may then designate a logical disk as unavailable (for storing electronic messages) based on the capacity of the logical disk being fully used. For example, the logical disk may be designated as unavailable based on the available storage capacity of the logical disk being less than a specified threshold amount. In an embodiment, the threshold amount may be specified as the amount needed to store another electronic message of average expected size. The storage controller 120 may then assign a future time (e.g., an hour later, a day later, a week later, etc.) to each logical disk that is available for writing (e.g., the logical disk is not designated as unavailable) based on the available storage capacity of the logical disk and estimated message storage requirements. For example, if the system 100 expects to receive, within the next 55 minutes, 30 messages, each of which is estimated to be deleted (estimated deletion times are explained below) within one hour, then a logical disk with a storage capacity that would be fully used (e.g., would then be designated as unavailable) by storing the 30 messages (of average expected size) may be assigned the future time one hour after the present time. In this way, the logical disk should first become unavailable by storing as many of the expected 30 messages as it can (e.g., within the first 55 minutes) and then shortly thereafter (e.g., within the next 5-10 minutes) the logical disk should be nearly emptied as the stored ephemeral messages are deleted based on the detection of triggering events.

When the storage controller 120 receives a message from the client device 115A, it may then determine a logical disk of the storage 130 in which to store the message. The storage controller 120 may first determine an estimated deletion time for the message, e.g., based on message parameters such as the sender or the message size as described below. The message can then be stored in a logical disk of storage 130 that has an assigned future time that is the best match for the estimated deletion time of the electronic message based on a comparison of the assigned future times and the estimated deletion time. A future time may be determined to be the best match for the estimated deletion time of the electronic message based on the comparison revealing that the assigned future time is the closest, of the assigned future times, to the estimated deletion time (e.g., a minimum distance from the estimated deletion time of the electronic message and the assigned future time of the logical disk). Alternatively the future may be determined to be the best match for the estimated deletion time of the electronic message based on the comparison revealing that the assigned future time is the closest, of the assigned future times, to the estimated deletion time without being earlier in time than the estimated deletion time so that the message is stored in a logical disk where it is likely to be deleted just before the assigned future time of said logical disk. In this way the message may never have to be copied to another logical disk of storage 130, as explained below, thus avoiding further storage and processing overhead and also minimizing disk fragmentation in storage 130. For example, if the storage controller 120 deletes all (or almost all) of the messages stored on a logical disk of storage 130 based on the detection of triggering events for each of the messages before the future time assigned to the logical disk, then the disk may be wiped clean and repurposed for storing a new set of messages with little effort, as explained below.

Once the storage controller 120 has deleted a sufficient number or amount of stored messages from a logical disk that has been designated as unavailable so that the logical disk has more than a threshold amount of unused storage capacity (e.g., 500 megabytes or 95% of total capacity), then the storage controller 120 may copy each of the electronic messages still stored in the unavailable logical disk to a logical disk that is available for writing. In this way, remaining messages may also be deleted from the unavailable logical disk so that the unavailable designation can be removed from the logical disk and it can be assigned a new future time in order to resume storing messages that are expected to be received. The basic reasoning being that, if a deletion triggering event is expected to be received for all of the stored messages in a unavailable logical disk just prior to the future time assigned to the logical disk, then the system 100 can rely on the storage capacity of the logical disk being available at the assigned future time with little additional processing overhead while minimizing disk fragmentation in storage 130 by reducing the number of write and delete operations. In an embodiment, the future time assigned to each logical disk may be specified by a system administrator instead of being dynamically determined based on system parameters as described above.

In an embodiment, the storage controller 120 is configured to copy each of the electronic messages stored in the unavailable logical disk to a logical disk available for writing by first determining a new estimated deletion time for the electronic message and then storing the electronic message in a logical disk of storage 130 with an assigned future time that is the best match for the new estimated deletion time of the electronic message. For example, the new estimated deletion time for each electronic message stored in the unavailable logical disk to be stored in a logical disk is determined based on the number of times each message has been copied by storage controller 120 from a logical disk of storage 130.

In an embodiment, the estimated deletion time for an electronic message from the sender 110A to a recipient 110B is specified based on parameters of the electronic message (e.g., type of message or size of message) or based on historical information regarding the behavior of the recipient 110B (e.g., recipient 110B usually reads messages quickly). For example, the historical information regarding the behavior of recipient 110B may include information regarding the behavior of the recipient 110B in regard to: electronic messages from the sender 110A, electronic messages including a type of electronic media, electronic messages received at a specific time, electronic messages received at a specific location, electronic messages received with a specific device, or electronic messages of a particular size (e.g., greater than a specific size). In this way the storage controller 120 may generate an accurate estimate of the time when a deletion triggering event for the electronic message will be received. In an embodiment, the historical information regarding the behavior of recipient 110B includes information regarding the behavior of the recipient 110B in regard to electronic messages from users of the network system 100 determined to be similar to the sender 110A, for example, based on: user location, user device or user behavior. In an embodiment, the historical information regarding the behavior of recipient 110B includes information regarding the behavior of the recipient 110B in regard to electronic messages including content determined to be similar to the content of the electronic message, for example, based on: image recognition, semantic analysis, tools used to create the content or user interface provided to view the content.

In an embodiment, the remote storage controller 120 transmits the message from the client device 115A to a client device 115B associated with a recipient 110B of the message upon receipt of a request from said client device 115B. The request could, for example, be automatic upon launching a messaging application on the client device 115B. The remote storage controller 120 may insert instructions in the message to instruct the client device 115B to store the message in memory for only a specified time period and/or to display the message for only a specified time period (e.g., specified by a messaging application on the client device 115A) so that the messages are "ephemeral" messages. The remote storage controller 120 may then delete the message from whichever of the logical disks of storage 130 it is currently stored on based on the detection of a triggering event. In some embodiments, the message may also be stored on the client device 115B but then subsequently deleted based on the detection of a triggering event. In an embodiment, the triggering event for deleting a message comprises responding to the message at the client device 115B prior to the expiration of the specified time period, for example, by sending a return message prior to the expiration of the specified time period without closing the messaging application.

System Architecture

Figure 2:
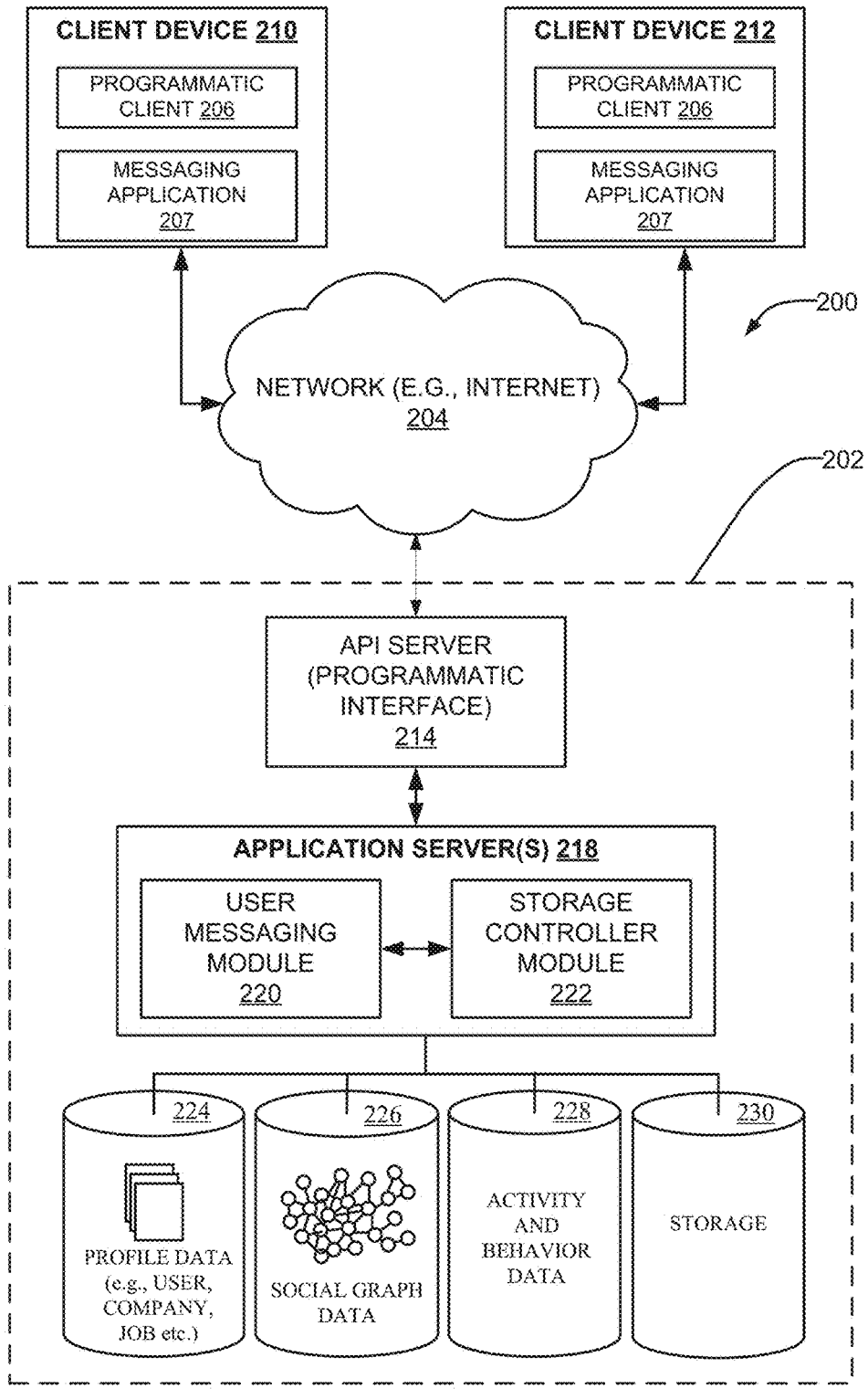
FIG. 2 is a block diagram illustrating an example of a network environment including a server operating a system for processing and storing messages for users of client devices, consistent with some embodiments.

FIG. 2 is a block diagram depicting a network system 200 having a client-server architecture configured for exchanging data over a network, according to one embodiment. For example, the network system 200 may be a messaging system where clients may communicate and exchange data within the network system 200. The data may pertain to various functions (e.g., sending and receiving text, photo and video communications) and aspects (e.g., publication of blogs and websites) associated with the network system 200 and its users. Although illustrated herein as client-server architecture, other embodiments may include other network architectures, such as peer-to-peer or distributed network environments.

A data exchange platform 202, in an example, includes a user messaging module 220 and a storage controller module 222, and may provide server-side functionality via a network 204 (e.g., the Internet) to one or more clients. Although described as residing on a server (e.g., application server(s) 218) in some embodiments, in other embodiments some or all of the functions of user messaging module 220 and a storage controller module 222 may be provided by a client device. The one or more clients may include users that use the network system 200 to exchange data over the network 204. These operations may include transmitting, receiving (communicating), and processing data to, from, and regarding content and users of the network system 200. The data may include, but is not limited to, content and user data such as user profiles, messaging content, messaging attributes, client device information, and geolocation information, among others.

In various embodiments, the data exchanges within the network system 200 may be dependent upon user-selected functions available through one or more client or user interfaces (UIs). The UIs may be associated with a client machine, such as client devices 210, 212 using a programmatic client 206, such as a client application. The programmatic client 206 may be in communication with the user messaging module 220 (and storage controller module 222) via an application server 218. The client devices 210, 212 may comprise mobile devices with wireless communication components and applications for sending specific types of electronic messages (e.g., ephemeral messages) over network 204 (e.g., via a messaging application 207).

Turning specifically to the user messaging module 220 and storage controller module 222, an application program interface (API) server 214 is coupled to, and provides programmatic interface to, one or more application server(s) 218 that host the user messaging module 220 and storage controller module 222. The application server(s) 218 is, in turn, shown to be coupled to storage in the form of one or more database(s) 224, 226, 228 and 230. The one or more database(s) 224, 226, 228 and 230 may include durable storage (e.g., non-volatile memory) and non-durable storage (e.g., volatile memory).

The API server 214 communicates and receives data pertaining to messages, among other things, via various user input tools. For example, the API server 214 may send and receive data to and from an application (e.g., via the programmatic client 206) running on another client machine (e.g., client devices 210, 212 or a third party server).

In one example embodiment, the user messaging module 220 provides messaging functionality for users of the client devices 210, 212 to send and receive ephemeral messages that automatically disappear after a triggering event has been detected, such as, for example the messages having been viewed by the recipient for a specified period of time. The client devices 210, 212 can access and view the messages via the application server(s) 218, which may access the message content from, for example, the database 230.

In an embodiment, one or more application server 218 includes or acts as a storage controller module 222 for database 230 that may include non-durable (e.g., volatile) and durable (e.g., non-volatile) memories for storing ephemeral messages received from a client device 210 or 212. The messages may be stored in a partition of the database 230 for a time period before being deleted or copied to another partition of the database 230. The messages may be deleted based on detection of a triggering event, such as the message being read by a recipient (e.g., recipient 110B via client device 212) of the message, responded to by a recipient of the message or copied to a storage device by a recipient of the message. For example, messages that are quickly read by the recipients (e.g., within the time period) may simply be deleted from the database 230 without having been copied to another partition of the database 230. The client device may be the client device 210 (e.g., a mobile device) of a user (e.g., sender 110A) of data exchange platform 202. The storage controller module 222 may partition the database 230 into logical disks for storing the electronic messages processed by user messaging module 220. The storage controller module 222 may then designate a logical disk as unavailable based on the capacity of the logical disk being fully used. For example, the logical disk may be designated as unavailable based on the available storage capacity of the logical disk being less than a specified threshold amount. In an embodiment, the threshold amount may be specified as the amount needed to store another electronic message of average expected size. The storage controller module 222 may then assign a future time (e.g., an hour later, a day later, a week later, etc.) to each logical disk that is available for writing (e.g., the logical disk is not designated as unavailable) based on the available storage capacity of the logical disk and estimated message storage requirements. For example, if the data exchange platform 202 expects to receive, within the next 23 hours, 300 messages, each of which is estimated to be deleted within one day, then a logical disk with a storage capacity that would be fully used (e.g., would then be designated as unavailable) by storing the 300 messages (of average expected size) may be assigned the future time one day later. In this way, the logical disk should first become unavailable by storing as many of the expected 300 messages as it can (e.g., within the first 23 hours), and then shortly thereafter (e.g., within the next hour) the logical disk should be nearly emptied as the stored ephemeral messages are deleted based on the detection of the expected triggering events (e.g., recipient 110B reads the electronic message).

When the storage controller module 222 receives a message from client device 210, it may then determine a logical disk of the database 230 in which to store the message. The storage controller module 222 may first determine an estimated deletion time for the message, e.g., based on message parameters such as the sender or the message size or based on historical behavior of a message recipient in regard to messages with similar parameters as described below with respect to databases(s) 224, 226 and 228. The message can then be stored in a logical disk of database 230 that has an assigned future time that is the best match for the estimated deletion time of the electronic message based on a comparison of the assigned future times and the estimated deletion time. A future time may be determined to be the best match for the estimated deletion time of the electronic message based on the comparison revealing that the assigned future time is the closest, of the assigned future times, to the estimated deletion time (e.g., a minimum distance from the estimated deletion time of the electronic message and the assigned future time of the logical disk). Alternatively the future may be determined to be the best match for the estimated deletion time of the electronic message based on the comparison revealing that the assigned future time is the closest, of the assigned future times, to the estimated deletion time without being earlier in time than the estimated deletion time so that the message is stored in a logical disk where it is likely to be deleted just before the assigned future time of said logical disk. In this way the message may message may never have to be copied to another logical disk of database 230, thus avoiding further storage and processing overhead and also minimizing disk fragmentation in database 230. For example, if the storage controller module 222 deletes all (or almost all) of the messages stored on a logical disk of database 230 based on the detection of triggering events for each of the messages before the future time assigned to the logical disk, then the logical disk may be wiped clean and repurposed for storing a new set of messages with little effort by the data exchange platform 202.

Once the storage controller module 222 has deleted a sufficient number or amount of stored messages from a logical disk that has previously been designated as unavailable, so that the logical disk has more than a threshold amount of unused storage capacity (e.g., 500 megabytes or 95% of capacity), then the storage controller module 222 may copy each of the electronic messages still stored in the unavailable logical disk to a logical disk that is available for writing. In this way, these remaining messages may also be deleted from the unavailable logical disk so that the unavailable designation can be removed from the logical disk and it can be assigned a new future time in order to resume storing messages that are expected to be received. The basic reasoning being that, if a deletion triggering event is expected to be received for all of the stored messages in a unavailable logical disk just prior to the future time assigned to the logical disk, then the system 200 can rely on the storage capacity of the logical disk being available at the assigned future time with little additional processing overhead while minimizing disk fragmentation in database 230 by reducing the number of write and delete operations. In an embodiment, the future time assigned to each logical disk may be specified by a system administrator instead of being dynamically determined based on system parameters as described above.

In an embodiment, the storage controller module 222 is configured to copy each of the electronic messages stored in the unavailable logical disk to a logical disk available for writing by first determining a new estimated deletion time for the electronic message and then storing the electronic message in a logical disk of database 230 (e.g., that is available for writing based on its available storage capacity and the size of the electronic message) with an assigned future time that is the best match for the new estimated deletion time of the electronic message. For example, the new estimated deletion time for each of the electronic messages stored in the unavailable logical disk to be stored in a logical disk is determined based on the number of times each electronic message has been copied by the storage controller module 222 from a logical disk of database 230.

In an embodiment, the estimated deletion time for an electronic message from a client device 210 (e.g., sender 110A) to a client device 212 (e.g., recipient 110B) is specified based on parameters of the electronic message (e.g., type of message or size of message) or based on historical information regarding the behavior of the recipient 110B (e.g., recipient 110B usually reads messages quickly). For example, the historical information regarding the behavior of the recipient 110B (e.g., in any of: activity and behavior data (database 228), social graph data (database 226) and profile data (database 224)) may include information regarding the behavior of the recipient 110B in regard to: electronic messages from the sender 110A, electronic messages including a type of electronic media, electronic messages received at a specific time, electronic messages received at a specific location, electronic messages received with a specific device, or electronic messages of a particular size (e.g., greater than a specific size). In this way the storage controller module 222 may generate an accurate estimate of the time when a deletion triggering event for the electronic message will be received. In an embodiment, the historical information regarding the recipient's behavior (e.g., in any of databases(s) 224, 226 and 228) includes information regarding the behavior of the recipient 110B in regard to electronic messages from users of the data exchange platform 202 determined to be similar to the sender 110A, for example, based on: user location, user device or user behavior. In an embodiment, the historical information regarding the behavior of the recipient 110B includes information regarding the behavior of the recipient 110B in regard to electronic messages including content determined to be similar to the content of the electronic message, for example, based on: image recognition, semantic analysis, tools used to create the content or user interface provided to view the content.

In an embodiment, the application server(s) 218 transmit (e.g., via user messaging module 220) the message from the client device 210 to a client device 212 associated with a recipient 110B of the message upon receipt of a request from said client device 212. The request could, for example, be automatic upon launching a messaging application 207 on the client device 212. The application server(s) 218 may insert instructions in the message to instruct the client device 212 to store the message in memory for only a specified time period and/or to display the message for only a specified time period (e.g., specified by the messaging application 207 of the client device 210) so that the messages are "ephemeral" messages. The application server(s) 218 may then delete the message from whichever of the logical disks of database 230 it is currently stored on based on the detection of a triggering event. In some embodiments, the message may also be stored on the client device 212 but then subsequently deleted based on the detection of a triggering event. In an embodiment, the triggering event for deleting a message comprises responding to the message at the client device 212 prior to the expiration of the specified time period, e.g., by sending a return message prior to the expiration of the time period without closing the messaging application 207.

User Interface

Figure 3:
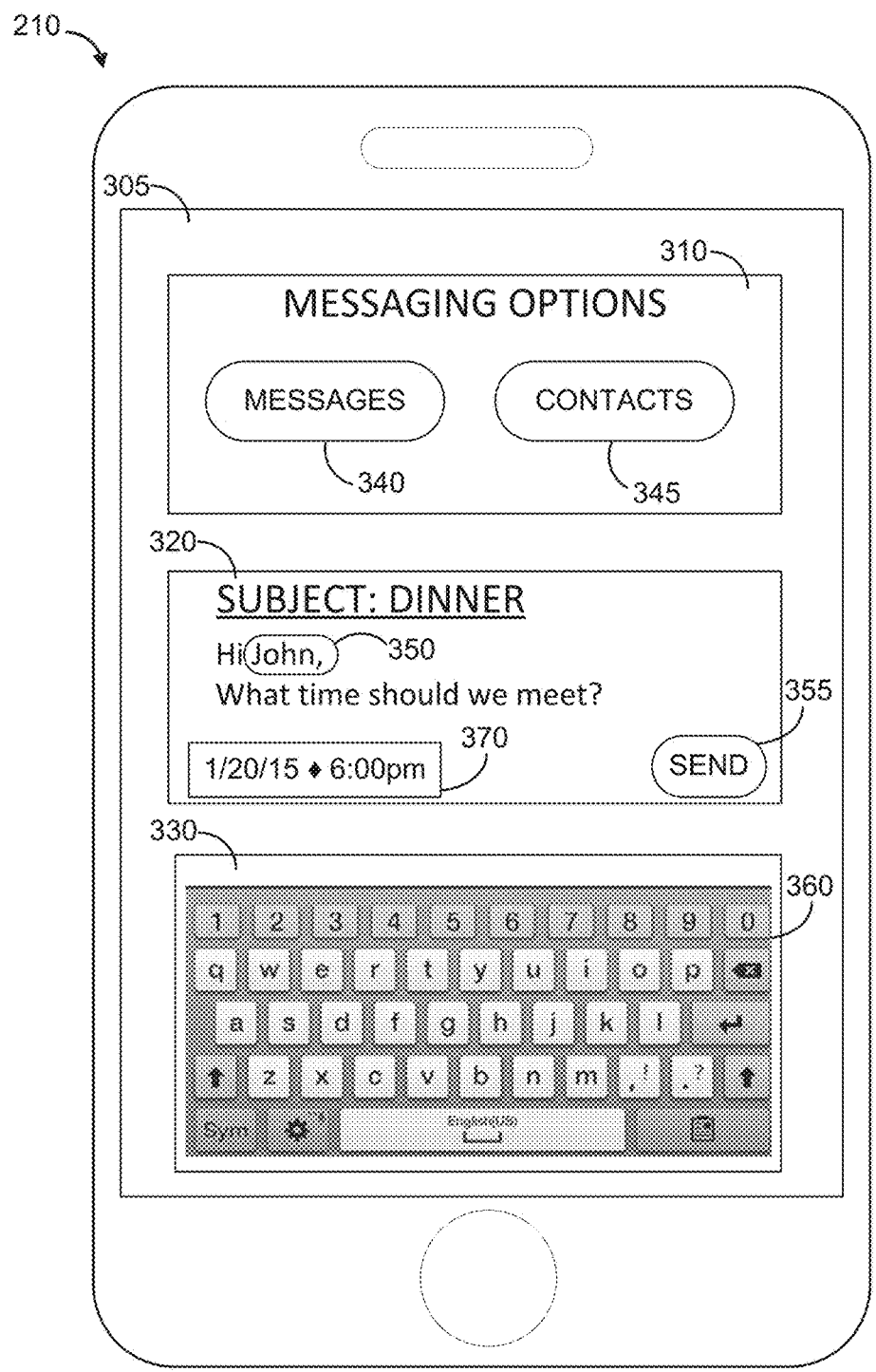
FIG. 3 is a display diagram illustrating messaging user interface options provided to a user of a mobile client device.

FIG. 3 is a display diagram illustrating messaging user interface options provided to a user (e.g., 110A) of a client device 210 in the form of a mobile computing device. As shown in FIG. 3, client device 210, including a display 305 and at least one processor, may send and/or receive a communication with the user messaging module 220 via the application server(s) 218 such as, for example, a communication initiating a short conversation with another client device 212 of the application server(s) 218. The client device 210 may present to a user, via user interface objects that may be generated by the messaging application 207 (e.g., user interface objects 310, 320 and 330 on the display 305), options associated with sending and receiving messages via application server(s) 218. As explained above, storage controller module 222 of application server(s) 218 stores an ephemeral message received from client device 210 in a logical disk of database 230 that is available for writing and has an assigned future time that is the best match for an estimated deletion time of the ephemeral message based on a comparison of the assigned future times and the estimated deletion time (e.g., closest or closest without being earlier). In this way, messages that are likely to be deleted at a known future time (e.g., the estimated deletion time) may be stored together in a logical disk that the data exchange platform 202 may rely on for storage capacity at the assigned future time with minimal processing and storage overhead via a minimized number of write and delete operations performed by data exchange platform 202.

In the example of FIG. 3, a sender 110A of a client device 210 may launch messaging application 207 for the purpose of sending an ephemeral message to another client device 212 of application server(s) 218. The sender 110A may then be presented with a selection of messaging options via a user interface object 310 (e.g., of messaging application 207) which provides options 340 and 345 for user selection. An ephemeral message viewing mode may be available via a "messages" option 340 to be used for viewing ephemeral communications between users of data exchange platform 202. These ephemeral messages are stored (e.g., in database 230) and then deleted after the detection of a triggering event, e.g., a recipient reads the message via the "messages" option 340 of the user interface object 310 of the messaging application 207. In the example, the "contacts" option 345 may launch a contact list associated with the messaging application 207, from which a recipient of a new ephemeral message may be selected. An "ephemeral" indicator may be included in messages sent via the messaging application 207 (e.g., by storage controller module 222) to specify storage parameters for the messages, e.g., nature of triggering events. Furthermore, many of the message parameters may be noted (e.g., time and date 370 or the message size) and used to help determine an estimated deletion time for the message. For example, the estimated deletion time may be based on a recognized subject typed into the subject line displayed in user interface object 320 via the keyboard 360 of user interface object 330. Other parameters, such as a recipient of the message as displayed via display object 350 of user interface object 330, may also be used.

In the example of FIG. 3, a sender 110A of a client device 210 may input a command to send the message via user option 355 of user interface object 320; this will result in the message being transmitted from the client device 210 to the user messaging module 220 of application server(s) 218. The message will then be stored in a logical disk of database 230 that is the best match, as explained above, based on the indicator included in the message (e.g., sent via ephemeral mode). The user messaging module 220 of application server(s) 218 will then transmit the message to client device 212 associated with a recipient (e.g., recipient 110B) of the message upon receipt of a request (e.g., launch messaging application 207) from client device 212. The user messaging module 220 may insert instructions in the message to instruct client device 212 to store the message in a local memory for only a specified time period and/or to display the message for only a specified time period (e.g., specified by the messaging application 207 of the client device 210) so that the messages are "ephemeral" messages. The storage controller module 222 may then delete the message from whichever logical disk of the storage 130 it is currently stored on based on the detection of a triggering event.

Data Flow

Figure 4:
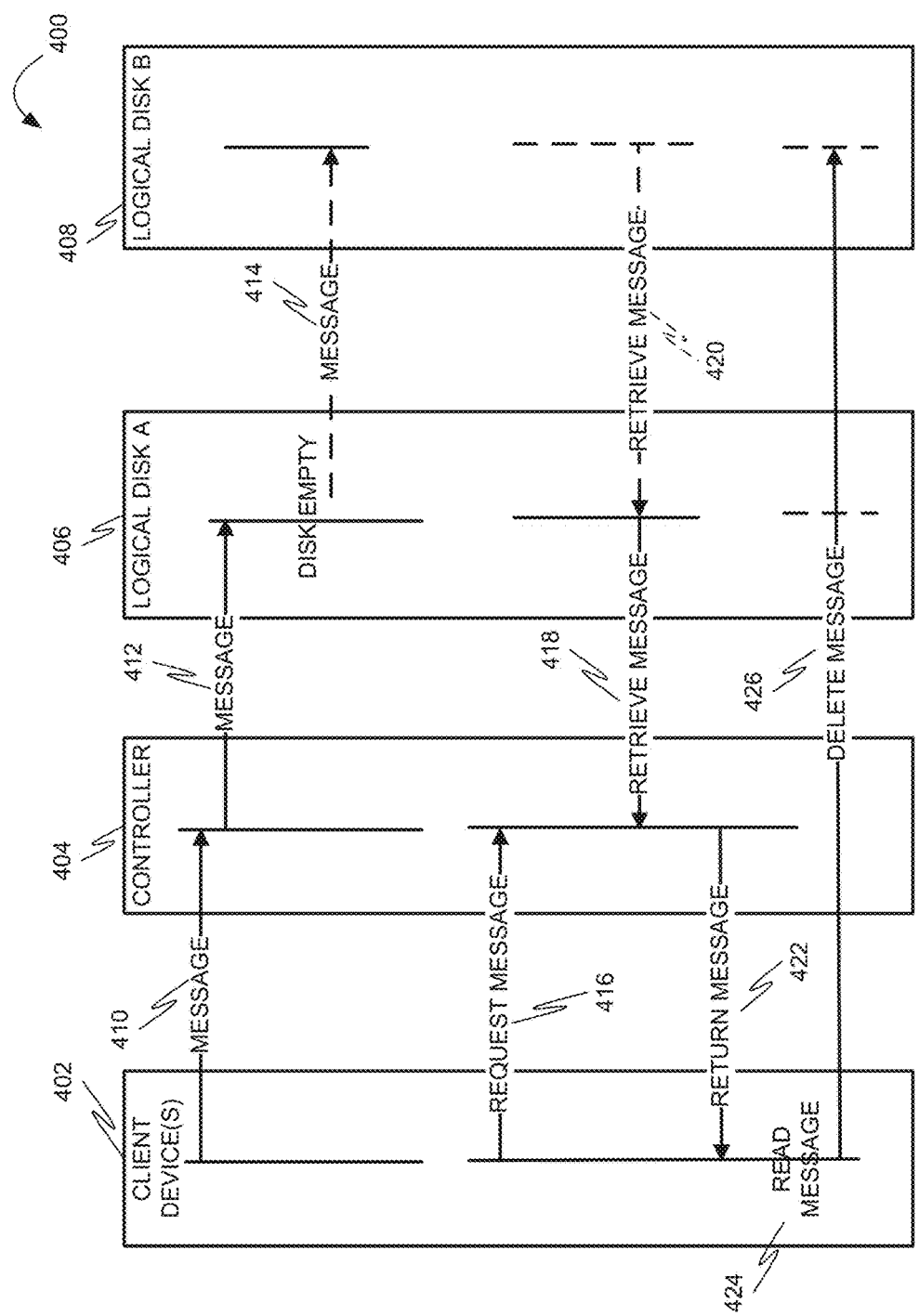
FIG. 4 is a ladder diagram illustrating a method, in accordance with an example embodiment, for processing and storing messages.

FIG. 4 is a ladder diagram illustrating a method 400, in accordance with an example embodiment, for processing and storing ephemeral messages. A client device (e.g., client device 210) of client device(s) 402 may be used to send an ephemeral message to a client device (e.g., client device 210) of client device(s) 402. At operation 410, the message (including an "ephemeral" indicator) is sent to storage controller 404 (e.g., storage controller module 222) which stores the message at operation 412 in logical disk A 406 (e.g., a partition of database 230) because an estimated deletion time for the message is determined to be a good match for a future time that has been assigned to logical disk A 406 (as explained above). The storage controller 404 may, optionally, write the message to logical disk B 408 (and delete it from logical disk A 406) at operation 414 if it is determined that: logical disk A 406 has been designated as unavailable based on its available storage capacity being fully used (e.g., less than a threshold amount remains) and has subsequently deleted most (nearly all) of the messages it was storing based on detection of triggering events for the deleted messages, e.g., as in operation 426 below. At operation 416, a client device (e.g., client device 212) of client device(s) 402 may request to receive a copy of the message from the storage controller 404. At operation 418 the storage controller 404 may identify and retrieve the stored message from the logical disk A 406. Alternatively the storage controller 404 may identify and retrieve the stored message from the logical disk A 406 based on whether operation 414 has been performed.

At operation 422, the storage controller 404 returns the requested message file to the requesting client device 212 of client device(s) 402. The storage controller 404 inserts instructions in the message so that the client device 212 of client device(s) 402 stores the message only for a specified time period and/or displays the message for only a specified period of time. At operation 424, requesting client device 212 of client device(s) 402 may read (e.g., view for at most the specified period of time) the received message. Finally, at operation 426 the storage controller 404 may delete the message from the logical disk A 406 or the logical disk B 408 based on the message having been read by all the recipients, in this case read by the client device 212 of client device(s) 402.

Methods

Figure 5:
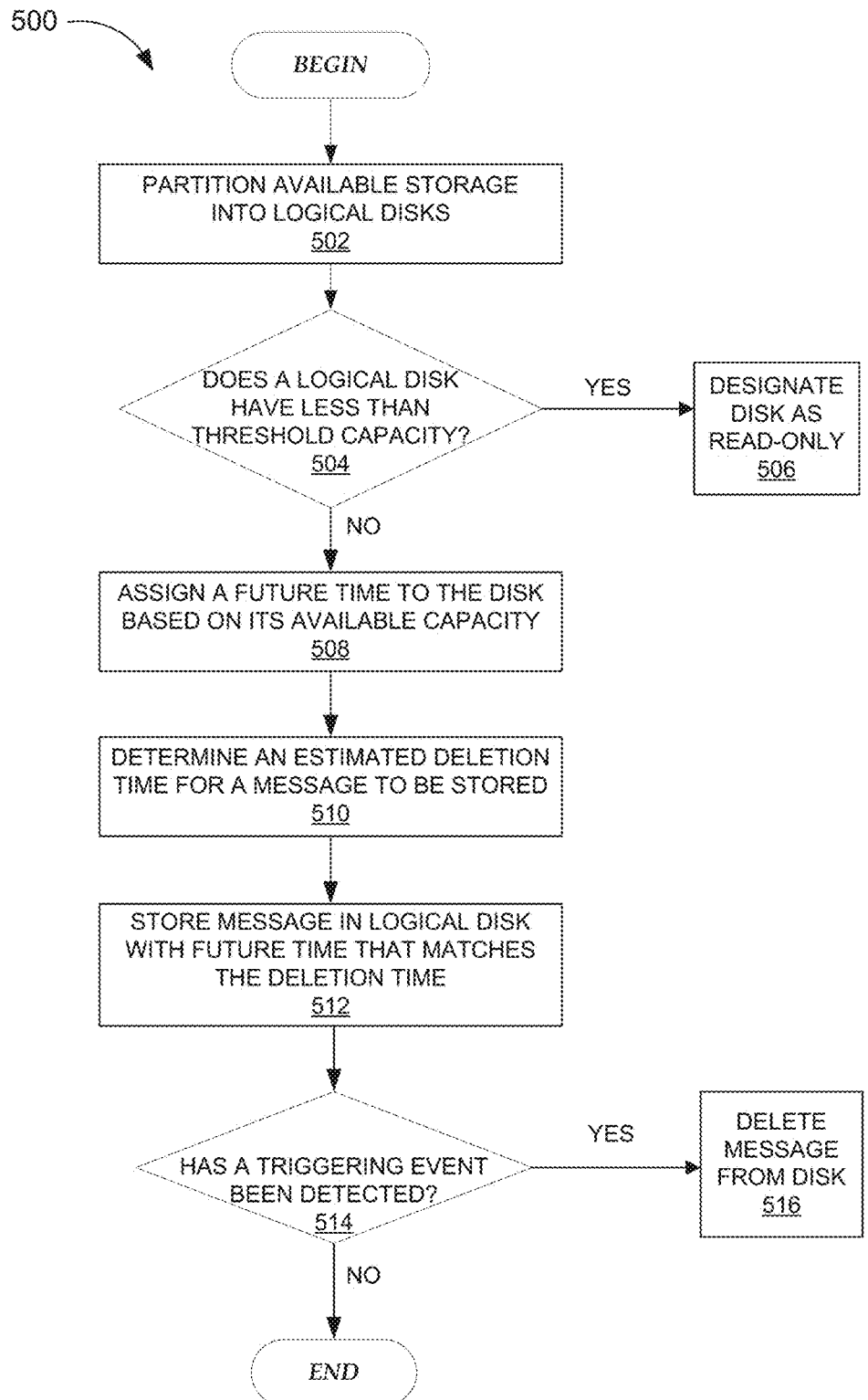
FIG. 5 is a flow diagram illustrating one example embodiment of an operation of the storage controller module.

FIG. 5 is a flow diagram illustrating an example method 500 of an operation of the storage controller module 222. At operation 502, the storage controller module 222 of the application server(s) 218 partitions the available database 230 into logical disks. At operation 504, the storage controller module 222 determines whether each logical disk has less than a threshold amount of available storage, e.g., less than would be needed to store a message of average size. At operation 506, the storage controller module 222 designates each logical disk as unavailable based on the determination that the logical disk does have less than a threshold amount of available storage. At operation 508, the storage controller module 222 assigns a future time to each logical disk available for writing (e.g., not designated as unavailable) based on the available capacity of each logical disk and the expected message storage requirements as explained above.

At operation 510, the storage controller module 222 estimates a deletion time for an ephemeral electronic message that has been received. As explained above, the estimated deletion time represents an estimate of when a triggering event for the message (e.g., the message is read by a recipient) is most likely to be received. At operation 512, the storage controller module 222 stores the ephemeral message in a logical disk with an assigned future time that is the best match (e.g., closest or closest without being earlier) for the estimated deletion time of the ephemeral message based on a comparison of the assigned future times and the estimated deletion time, as explained above. At operation 514, it is determined whether a triggering event associated with the ephemeral message has been detected; if not, then the method 500 ends. At operation 516, if a triggering event has been detected at operation 514, then the message may be deleted from the logical disk.

Figure 6A:
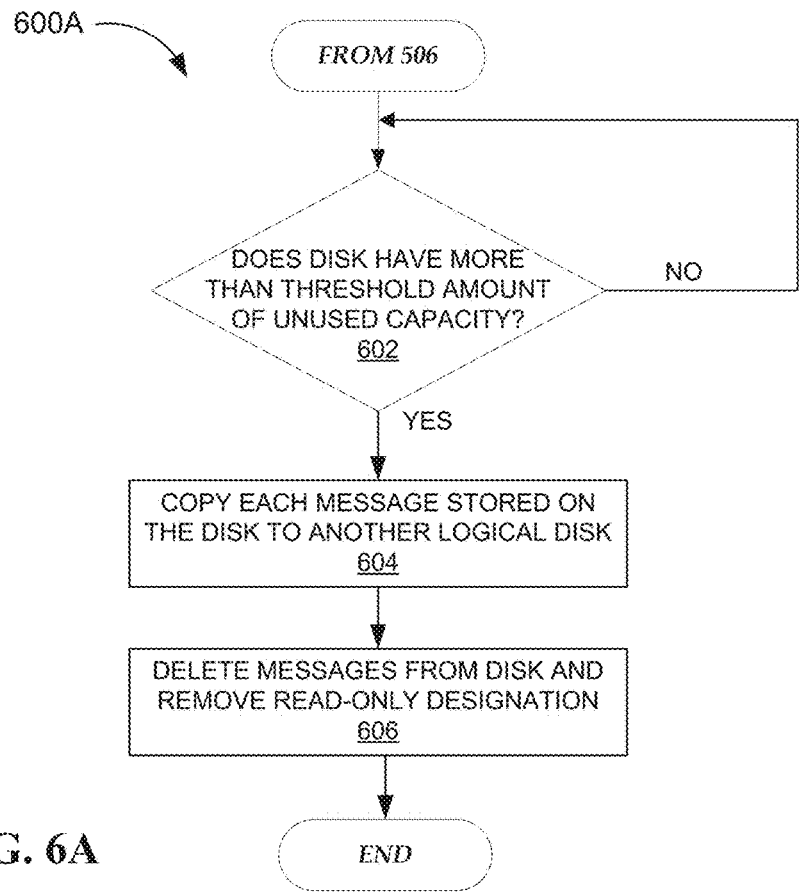
FIGS. 6A and 6B are flow diagrams illustrating example embodiments of operations of the storage controller module.

FIG. 6A is a flow diagram illustrating one example embodiment of a method 600A of the storage controller module 222. At operation 602, which continues from operation 506 of FIG. 5, the storage controller module 222 determines whether each unavailable logical disk has more than a threshold amount of unused storage capacity. In other words, it is determined whether all (or nearly all) of the ephemeral messages stored in a unavailable logical disk have been deleted based on the detection of a triggering event associated with each of the deleted messages. If there is not sufficient storage capacity available in a unavailable disk, the storage controller module 222 continues to wait for more triggering events. If there is sufficient storage capacity available in a unavailable disk, the storage controller module 222, at operation 604, copies each ephemeral message still stored on the unavailable logical disk to a logical disk that is available for writing and has sufficient unused capacity to store the message. At operation 606, the storage controller module 222 proceeds to delete the remaining messages from the unavailable logical disk and remove the unavailable designation from the logical disk so that it may again be used for storage, e.g., storing ephemeral messages.

Figure 6B:
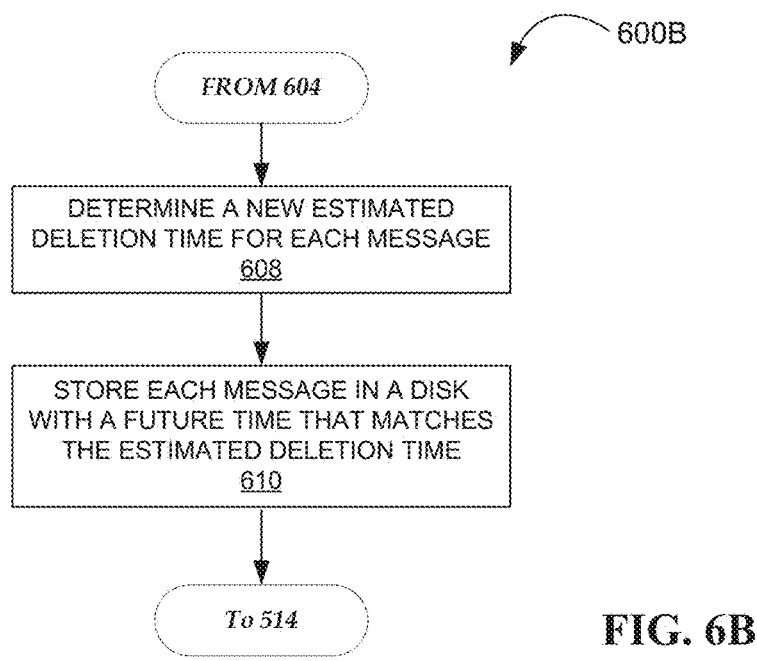

FIG. 6B is a flow diagram illustrating one example embodiment of a method 600B of the storage controller module 222. At operation 608, which continues from operation 604 of FIG. 6A, the storage controller module 222 estimates a new deletion time for each ephemeral electronic message that is to be copied to a new logical disk. As explained above, the estimated deletion time represents an estimate of when a triggering event for the message (e.g., message is read by a recipient) is most likely to be received. At operation 610, the storage controller module 222 stores (e.g., copies) the ephemeral message to a logical disk of database 230 with an assigned future time that is the best match (e.g., closest or closest without being earlier) for the new estimated deletion time of the ephemeral message to be copied as explained above. The method 600B may then proceed to operation 514 of FIG. 5 in order to wait for triggering events associated with the messages that have been copied to a new logical disk.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 105 or network 204 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 7:
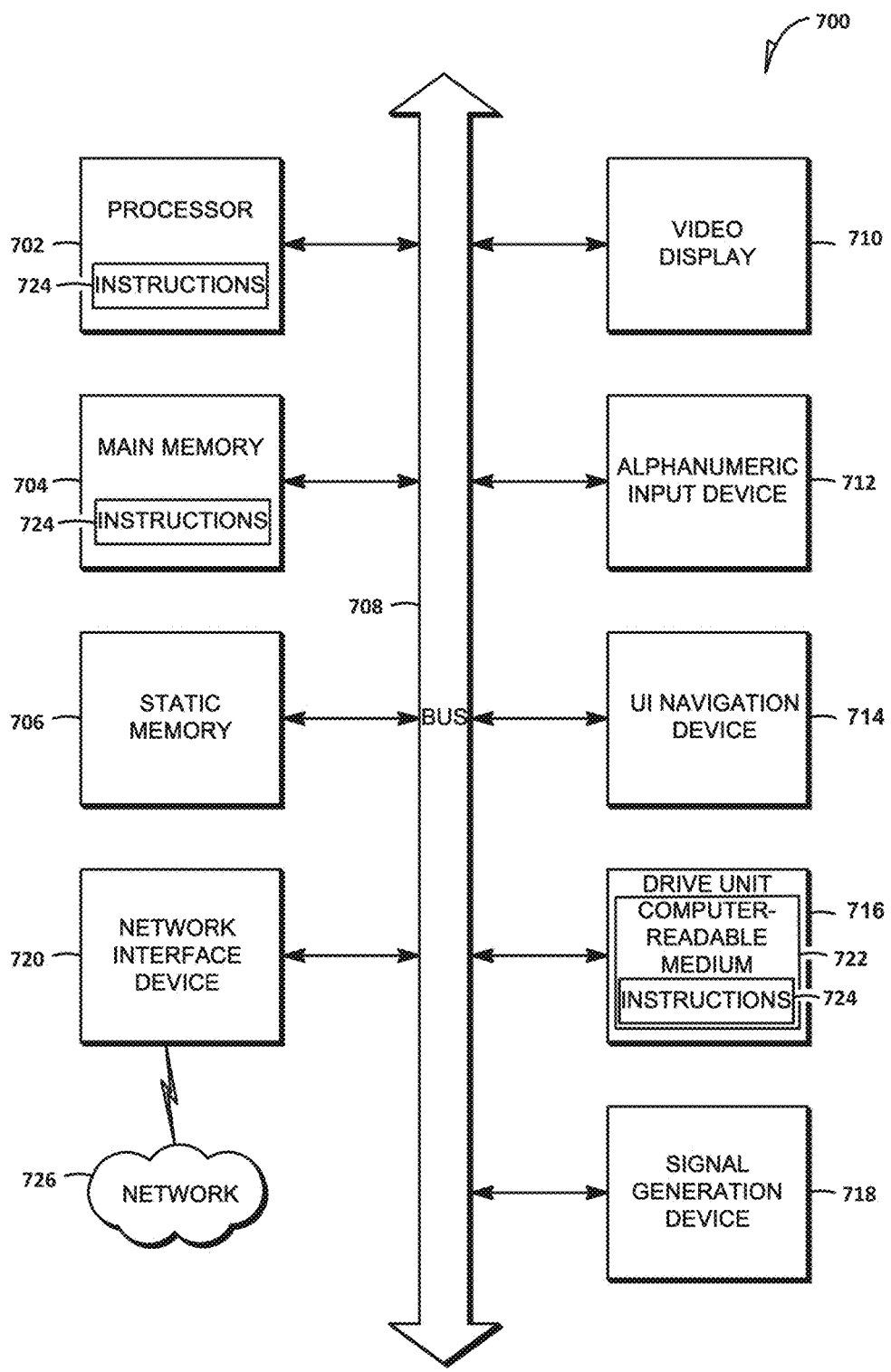
FIG. 7 is a diagrammatic representation of machine, in the example form of a computer system, within which a set of instructions may be executed to cause the machine to perform any of the methodologies discussed herein.

FIG. 7 shows a diagrammatic representation of a machine in the example form of a machine or computer system 700 within which a set of instructions 724 may be executed, causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a drive unit 716, a signal generation device 718 (e.g., a speaker), and a network interface device 720.

The drive unit 716 includes a computer-readable medium 722 on which is stored one or more sets of data structures and instructions 724 (e.g., software) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable.

The instructions 724 may further be transmitted or received over a network 726 via the network interface device 720 utilizing any one of a number of well-known transfer protocols (e.g., HTTP).

While the computer-readable medium 722 is shown in an example embodiment to be a single medium, the term "computer-readable medium" should be taken to include a single medium or multiple photo (e.g., a centralized or distributed database, and/or associated caches and servers) that store the one or more sets of instructions 724. The term "computer-readable medium" shall also be taken to include any medium that is capable of storing, encoding, or carrying a set of instructions 724 for execution by the machine that cause the machine to perform any one or more of the methodologies of the present disclosure, or that is capable of storing, encoding, or carrying data structures used by or associated with such a set of instructions 724. The term "computer-readable medium" shall, accordingly, be taken to include, but not be limited to, solid-state memories, optical photo, and magnetic photo.

Furthermore, the computer-readable medium 722 is non-transitory in that it does not embody a propagating signal.

However, labeling the tangible computer-readable medium 722 "non-transitory" should not be construed to mean that the medium 722 is incapable of movement—the medium 722 should be considered as being transportable from one physical location to another. Additionally, since the computer-readable medium 722 is tangible, the medium 722 may be considered to be a machine-readable device.

Example Mobile Device

Figure 8:
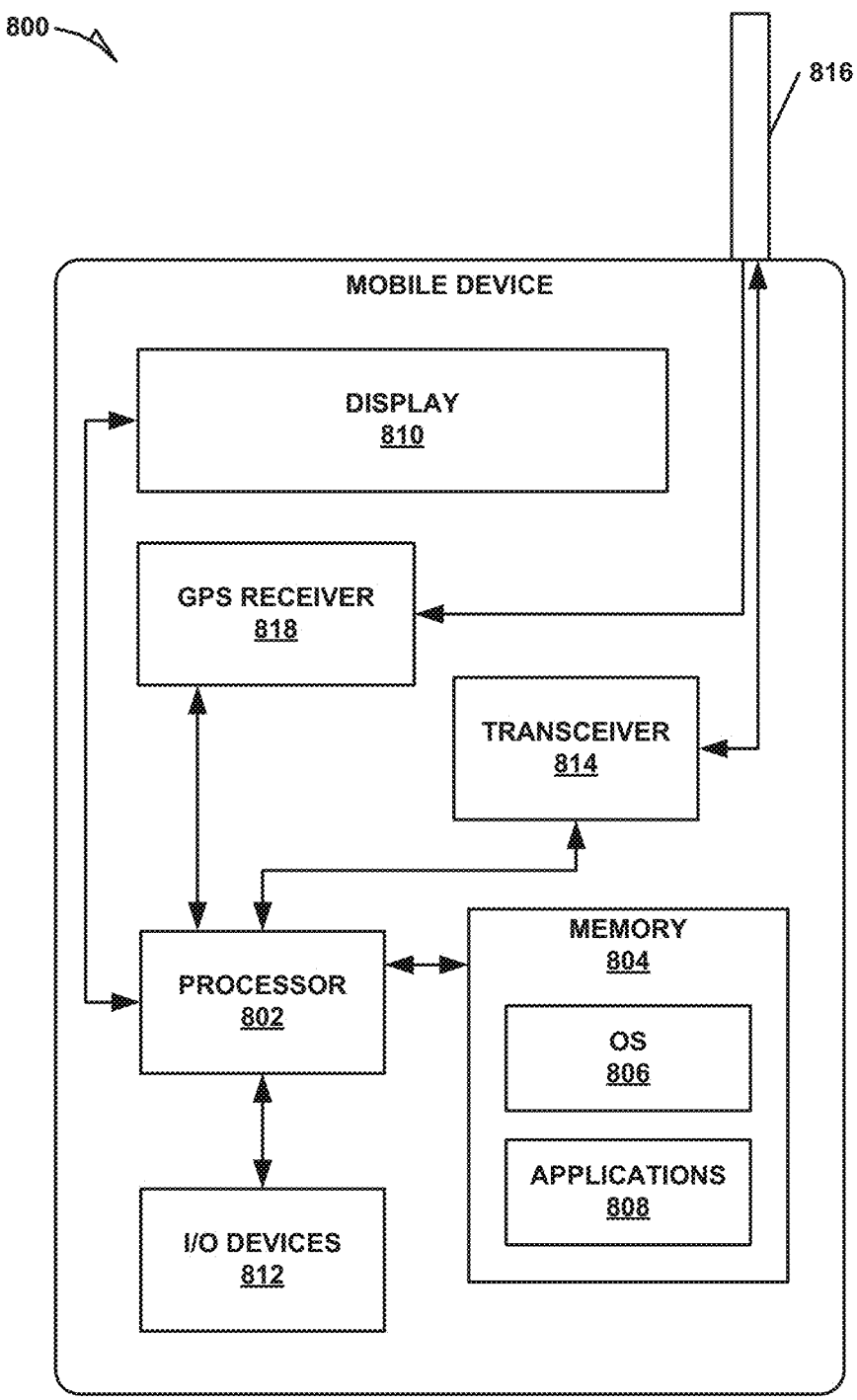
FIG. 8 is a block diagram illustrating a mobile device, according to an example embodiment.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as applications 808, such as a mobile location enabled application that may provide location-based services (LBSs) to a user. The processor 802 may be coupled, either directly or via appropriate interphotory hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a storage device for storing electronic messages sent between users of a network; and
   a storage controller implemented by at least one processor and configured to:
   assign a future time to each of a plurality of logical disks, each future time indicating when the logical disk is available for writing, the assignments based on an available storage capacity of the logical disk;
   determine an estimated prospective deletion time for an electronic message;
   selecting one of the plurality of logical disks having an assigned future time closest to the estimated prospective deletion time or having an assigned future time closest to the estimated prospective deletion time without being earlier than the estimated prospective deletion time; and
   store the electronic message in the selected logical disk.

2. The system of claim 1, wherein the storage controller is further configured to delete the electronic message in response to the electronic message being read by a recipient of the electronic message, responded to by a recipient of the electronic message or copied to a storage device by a recipient of the electronic message.

3. The system of claim 1, wherein the storage controller is configured to perform the following based on an unavailable logical disk having more than a second threshold amount of unused storage capacity:

copy each of the electronic messages stored in the unavailable logical disk to a logical disk available for writing;

delete each of the electronic messages stored in the unavailable logical disk; and remove the unavailable designation from the logical disk.

4. The system of claim 3, wherein the storage controller is configured to perform the following to copy each of the electronic messages stored in the unavailable logical disk to a logical disk available for writing:

determine a new estimated deletion time for the electronic message;

compare the assigned future time of each logical disk available for writing to the new estimated deletion time of the electronic message; and store the electronic message in a logical disk that is identified based on the comparing.

5. The system of claim 4, wherein the new estimated deletion time for each of the electronic messages stored in the unavailable logical disk is determined based on the number of times each electronic message has been copied by the storage controller.

6. The system of claim 1, wherein the storage controller is configured to determine the estimated prospective deletion time for the electronic message from a sender to a recipient based on historical information regarding behavior of the recipient.

7. The system of claim 6, wherein the historical information includes information regarding the behavior of the recipient in regard to electronic messages: from the sender, including a type of electronic media, received at a specific time, received at a specific location, received with a specific device, or of a specific size.

8. The system of claim 6, wherein the historical information includes information regarding the behavior of the recipient in regard to electronic messages from users of the network determined to be similar to the sender based on: user location, user device or user behavior.

9. The system of claim 6, wherein the historical information includes information regarding the behavior of the recipient in regard to electronic messages including content determined to be similar to content of the electronic message based on: image recognition, semantic analysis, tools used to create the content or user interface provided to view the content.

10. A method for storing electronic messages sent between users of a network, the method comprising:

assigning a future time to a plurality of logical disks;

determining an estimated prospective deletion time for an electronic message;

selecting one of the plurality of logical disks having an assigned future time closest to the estimated prospective deletion time or having an assigned future time closest to the estimated prospective deletion time without being earlier than the estimated prospective deletion time; and storing the electronic message in the selected logical disk.

11. The method of claim 10, wherein:

the comparing includes identifying at least one of the assigned future times that is closest to the estimated prospective deletion time or is closest to the estimated prospective deletion time without being earlier than the estimated deletion time; and the method further comprising:

deleting the electronic message in response to the electronic message being read by a recipient of the electronic message, responded to by a recipient of the electronic message or copied to a storage device by a recipient of the electronic message.

12. The method of claim 10, further comprising:

performing the following based on an unavailable logical disk having more than a threshold amount of unused storage capacity:

copying each of the electronic messages stored in the unavailable logical disk to a logical disk available for writing;

deleting each of the electronic messages stored in the unavailable logical disk; and removing the unavailable designation from the logical disk.

13. The method of claim 12, further comprising:

copying each of the electronic messages stored in the unavailable logical disk to a logical disk available for writing by:

determining a new estimated deletion time for the electronic message;

comparing the assigned future time of each logical disk available for writing to the new estimated deletion time of the electronic message; and storing the electronic message in a logical disk that is identified based on the comparing.

14. The method of claim 10, further comprising determining the estimated prospective deletion time for the electronic message based on historical information regarding behavior of a recipient of the electronic message.

15. A non-transitory machine-readable medium storing program code for storing electronic messages sent between users of a network which, when executed, is operative to cause a machine to perform the steps of:

assigning a future time to a plurality of logical disks;

determining an estimated prospective deletion time for an electronic message;

selecting one of the plurality of logical disks having an assigned future time closest to the estimated prospective deletion time or having an assigned future time closest to the estimated prospective deletion time without being earlier than the estimated prospective deletion time; and storing the electronic message in the selected logical disk.

16. The machine-readable medium of claim 15, further comprising:

performing the following based on an unavailable logical disk having more than a threshold amount of unused storage capacity:

copying each of the electronic messages stored in the unavailable logical disk to a logical disk available for writing;

deleting each of the electronic messages stored in the unavailable logical disk; and removing the unavailable designation from the logical disk.

17. The machine-readable medium of claim 16, further comprising:

copying all of the electronic messages stored in the unavailable logical disk to the logical disk available for writing by:

determining a new estimated deletion time for the electronic message;

comparing the assigned future time of each logical disk available for writing to the new estimated deletion time of the electronic message; and storing the electronic message in a logical disk that is identified based on the comparing.

18. The system of claim 1, wherein the storage controller is further configured to select a logical disk with an assigned future time later than the estimated prospective deletion time.

19. The system of claim 1, wherein the storage controller is further configured to:
- estimate a number of new messages received within a future time period;
- estimate an amount of storage to store the new messages at a time later than the future time period;
- assign a future time to a logical disk based on the estimates; and
- select the logical disk for storage of the new messages based on the assigned future time.

\* \* \* \* \*